United States Patent [19]

Marschke et al.

[11] Patent Number: 5,472,540

[45] Date of Patent: Dec. 5, 1995

[54] METHOD AND APPARATUS FOR MAKING PALLET SUPPORTS AND PALLETS INCORPORATING SAID SUPPORTS

[75] Inventors: Carl R. Marschke; Harold D. Welch, both of Phillips, Wis.

[73] Assignee: Marquip, Inc., Phillips, Wis.

[21] Appl. No.: 191,074

[22] Filed: Feb. 2, 1994

[51] Int. Cl.⁶ .................................................. B32B 31/00
[52] U.S. Cl. .......................... 156/184; 156/189; 156/257; 108/53.1; 206/599; 242/526.1; 493/303
[58] Field of Search ........................... 156/184, 187, 156/188, 189, 190, 191, 193, 192, 446, 448, 456, 457, 257; 108/53.1, 53.5; 206/599; 493/74, 349, 303–306, 964, 965; 242/526.1

[56] References Cited

U.S. PATENT DOCUMENTS

| | | | |
|---|---|---|---|
| 2,038,064 | 4/1936 | Stetson | 206/599 X |
| 2,388,730 | 11/1945 | Fallert . | |
| 2,493,562 | 1/1950 | Yarman . | |
| 2,691,499 | 10/1954 | Watts . | |
| 2,894,671 | 7/1959 | Nicholls | 206/599 X |
| 3,112,895 | 12/1963 | Kinney | 156/189 X |
| 3,115,988 | 12/1963 | Warnken | 156/189 X |
| 3,348,302 | 10/1967 | Foerster | 156/188 X |
| 3,503,820 | 3/1970 | Galbato | 156/189 |
| 3,700,535 | 10/1972 | McCoy et al. | 156/189 X |
| 4,850,284 | 7/1989 | DeGroot et al. | 108/56.3 |
| 5,083,996 | 1/1992 | Smith | 493/344 |
| 5,184,558 | 2/1993 | Wozniacki | 108/51.3 |
| 5,218,913 | 6/1993 | Winebarger et al. | 108/51.3 |
| 5,289,781 | 3/1994 | Beckway | 108/51.3 |

Primary Examiner—James Engel
Attorney, Agent, or Firm—Andrus, Sceales, Starke & Sawall

[57] ABSTRACT

A method and apparatus for manufacturing recyclable paper pallets utilizes spool-shaped laminated supports which are wound on a spool-shaped mandrel utilizing adhesive coated paper strips. In one aspect of the invention, the spool-shaped laminated supports can be glued to conventional upper and lower pallet skin sheets also made of paper material, such as corrugated paperboard. In another aspect of the invention, the spool-shaped pallet supports are utilized in a system in which the pallet is integrated directly into a pre-strapped load. In this system, a slip sheet is strapped directly to the bottom of a load and the slip sheet is glued directly to the upper faces of an array of pallet supports, sufficient to support the load and to provide the spacers or standoffs for subsequent insertion of lifting equipment, such as a lifting fork, beneath the load. The inherent rigidity of the strapped load may be sufficient to compensate for the lack of rigidity of the thin paper slip sheet. If the supported load does not have adequate structural rigidity, a lower structural skin sheet may be glued to the lower faces of the pallet support array to provide the strength in compression needed to lift the palletized load. The system of the present invention provides wide flexibility allowing pallet systems to be utilized which are adequate to support the intended load with a minimum use of materials. The spool-shaped supports may be manufactured on-site and the pallets formed on the in-line system processing the material loads. An alternate pallet support is made from a strip cut from a continuous web of single face corrugated paperboard.

17 Claims, 3 Drawing Sheets

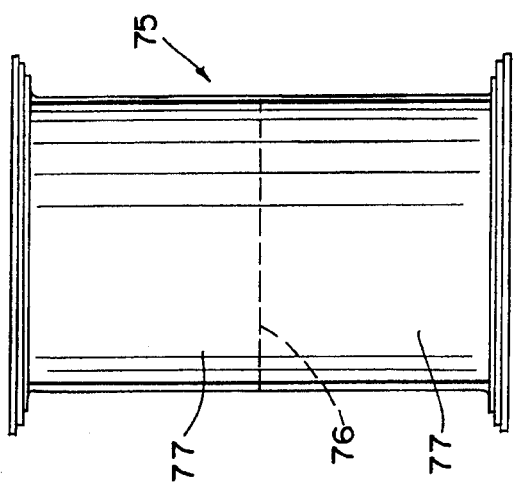
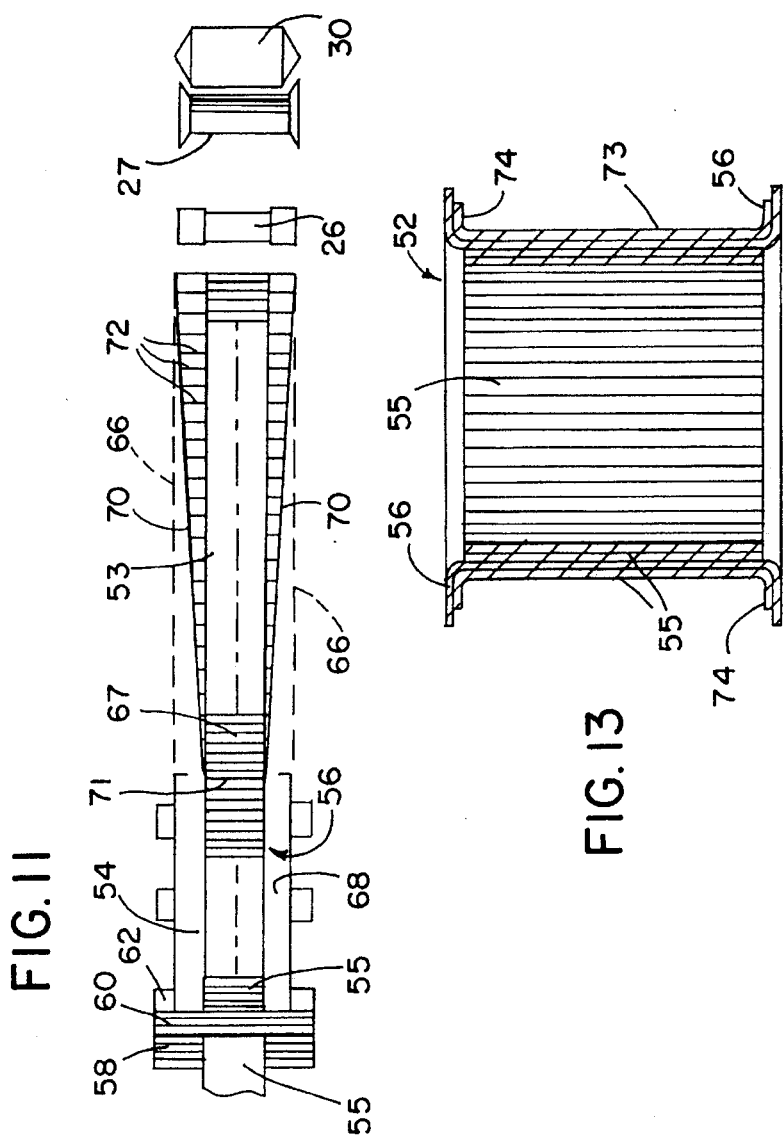
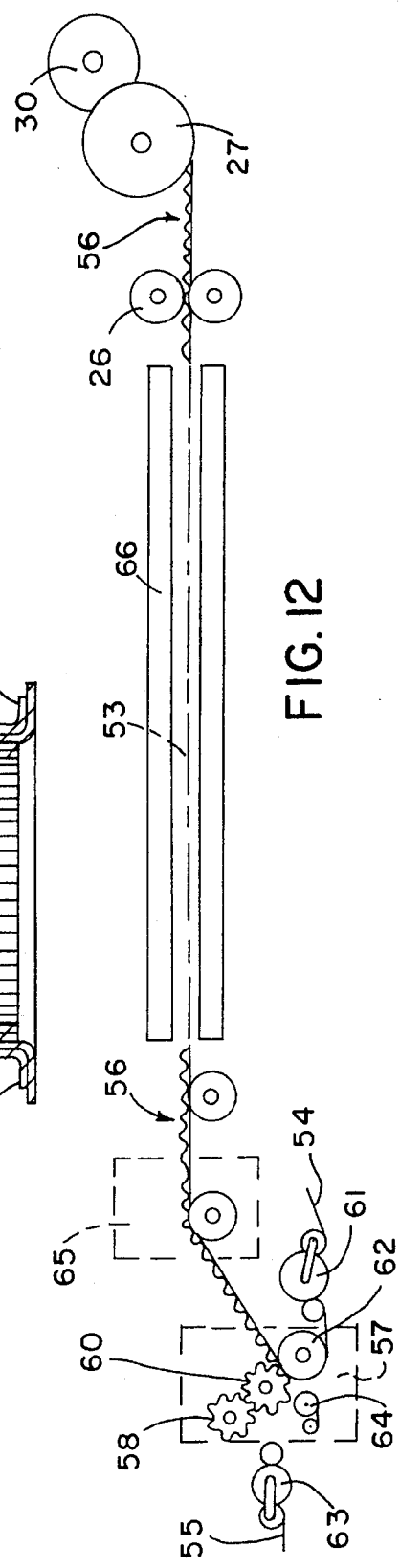

METHOD AND APPARATUS FOR MAKING
PALLET SUPPORTS AND PALLETS
INCORPORATING SAID SUPPORTS

BACKGROUND OF THE INVENTION

The present invention relates to a method and apparatus for making lightweight recyclable load-supporting pallets, including uniquely wound pallet supporting members and, more particularly, to a method and apparatus for making such pallets from paper sheet material.

Pallets used to support loads of material for storage and transport are well known in the art and are made in many shapes from a wide variety of materials. Industrial pallets typically include a planar upper load-supporting layer and a number of foot-like supports attached to the underside of the layer to provide space for the insertion of a lifting mechanism, such as the fork of a forklift truck. Pallets are also often made with two planar layers separated and interconnected by the foot-like spacers or supports. Pallets have been made with a variety of materials, including metal, wood, plastic, fiberboard and paperboard, as well as combinations or composites of such materials.

Although wooden pallets are probably the most commonly used in most commercial and industrial applications, wooden pallets are still relatively expensive and, when the supported load is strapped to and shipped with the pallet, the pallet is lost. For many years the search for a replacement for conventional wooden pallets has led to the development of a wide variety of paper and paperboard pallets. Pallets made of paper or paperboard are generally considered to be much less costly to manufacture, more easily disposed of when damaged or destroyed, and potentially even recyclable. However, the inherent lower strength and durability of paper and paperboard, as compared to wood, has to date prevented the development of a fully functional, lightweight, recyclable paper pallet.

Prior art paper and paperboard pallets are shown in the following U.S. patents which are representative of the state of the art: 2,388,730; 2,493,562; and, 2,691,499.

It would also be desirable to have a disposable or recyclable pallet manufacturing operation which could be operated on-site and integrated directly into the material handling system for the products being loaded on and strapped to pallets for storage or shipment.

SUMMARY OF THE INVENTION

The present invention, in its various aspects, is directed to a method and related apparatus for manufacturing recyclable paper pallets which may be readily adapted to provide a minimum fiber content for the loads to be supported thereon and which may be integrated directly into the material handling system with on-site manufacturing and assembly of the pallets and attachment of the supported material loads thereto.

One aspect of the present invention is directed to a method for manufacturing a foot-like paper pallet support or spacer and comprises the steps of forming a narrow strip of paper, applying a coating of adhesive to one side of the paper strip, winding the coated paper strip onto a flanged spool to form a hollow laminated flanged support, and removing the support from the spool. The paper strip is preferably tapered along its length and is wound on the spool by initially attaching the wider end of the strip to the spool. The method also includes the preferred steps of slitting a portion of both longitudinal edges of the paper strip in a generally transverse direction, and allowing the edges of the strip which form the flanges to flare during the winding of the strip on the spool. The adhesive coating is preferably applied only to the portion of the strip which, in the subsequent winding step, overlies a wrap of the strip which has been previously wound.

The method of the present invention also includes the preliminary steps of cutting a rectangular sheet of paper from a web, which sheet has a length equal to the length of the strip and an area two times the area of the strip, cutting the paper sheet in a generally longitudinal direction to form two substantially identical paper strips which are tapered along their lengths, slitting portions of both longitudinal edges of both strips in a generally transverse direction, and performing the steps of applying the adhesive coating, winding the coated strip, and removing the formed supports separately on each of the two strips.

Each of the formed supports includes a generally cylindrical body and integral end flanges. The preferred method also includes a step of positioning the paper from which the strip is prepared to orient the major proportion of the paper fibers in the transverse direction across the strip, such that the fibers in the cylindrical body of the completed support extend primarily parallel to the axis thereof.

In accordance with another aspect of the invention, a method for manufacturing a pallet comprises the steps of forming narrow strips of paper, applying an adhesive coating to one side of each paper strip, winding each of the coated paper strips on a flanged spool to form hollow laminated flanged supports, each including a generally cylindrical body and integral end flanges, removing the supports from the spools, and bonding a plurality of said flanged supports to a first planar pallet skin by providing an adhesive layer between the flange end faces and the surface of said first pallet skin.

The method also includes the step of bonding the flanged supports to a second planar pallet skin by providing an adhesive layer between the opposite flange end faces and the surface of the second pallet skin. In one embodiment, the first pallet skin comprises a paper sheet strapped to the lower surface of a load to be supported on the pallet. The first pallet skin may comprise a flexible paper sheet and the second pallet skin a rigid paperboard sheet.

The related apparatus for manufacturing a pallet support comprises means for forming a narrow strip of paper, means for applying an adhesive coating to one side of the paper strip, means for winding the coated paper strip on a flanged spool to form a hollow laminated flanged support, and means for removing the support from the spool. The apparatus of the preferred embodiment utilizes a paper strip which is tapered along its length, and the winding means is operative to initially attach the wider end of the paper strip to the spool. The apparatus also preferably includes means for slitting a portion of both longitudinal edges of the paper strip in a generally transverse direction such that the edges of the strip forming the flanges of the support are allowed to flare during operation of the winding means.

In a further embodiment of the present invention, a method for securing a load of material on a pallet comprises the steps of placing the load atop a paper sheet, strapping the sheet to the load with load-encircling straps disposed in generally vertical planes, preparing a plurality of laminated paper supports, each of which is made from a wound adhesive-coated paper strip and comprises a generally cylindrical hollow body and opposite integral end flanges, and bonding the underside of the sheet strapped to the load onto the upwardly facing end faces of the upper flanges of an array of said pallet supports by providing an adhesive layer between said end faces and said paper sheet. The method may also include the step of bonding the top surface of a rigid paperboard sheet to the downwardly facing end faces of the lower flanges of said array by providing an adhesive layer between said downwardly facing end faces and said paperboard sheet. A variant method includes the step of adhesively attaching circular paper closure disks to the downwardly facing end faces of the lower flanges of said array of pallet supports.

BRIEF DESCRIPTION OF THE DRAWINGS

FIG. 11 is a schematic top plan view of an alternate apparatus for making a further embodiment of the support of the present invention.

FIG. 12 is a front elevation view of the apparatus shown in FIG. 11.

FIG. 13 is a vertical section, similar to FIG. 6, showing the alternate embodiment of the laminated pallet support made with the apparatus of FIGS. 11 and 12.

FIG. 14 is a side elevation of a further embodiment of the laminated pallet support of the present invention.

DETAILED DESCRIPTION OF THE PREFERRED EMBODIMENTS

Figures 1, 2, 3, 4, 5, 6:
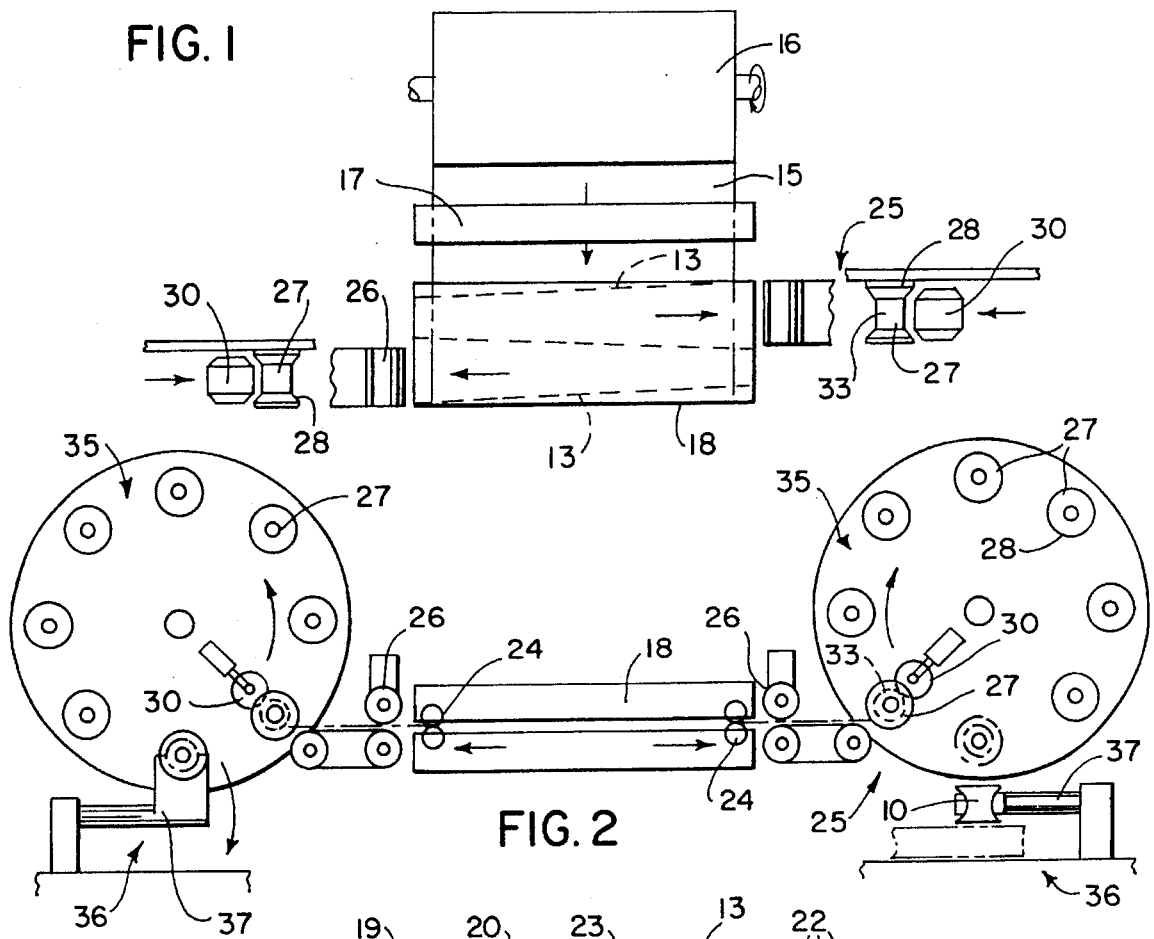
FIG. 1 is a generally schematic top plan view of an apparatus for making the supports of the present invention.
FIG. 2 is a front elevation view of the apparatus shown in FIG. 1.
FIG. 3 is a top plan view of a paper sheet showing the cutting pattern from which are formed the strips used to make laminated supports on the apparatus of FIGS. 1 and 2.
FIG. 4 is a side elevation of a laminated pallet support in accordance with one aspect of the present invention.
FIG. 5 is a top plan view of the support shown in FIG. 4.
FIG. 6 is a vertical section taken on line 6—6 of FIG. 5.

In FIGS. 4–6, there is shown a laminated pallet support 10 of the present invention which is manufactured by winding an adhesive backed strip onto a spool-shaped mandrel, as shown schematically in FIGS. 1–3 and to be described in detail hereinafter. Supports 10 of the present invention are utilized in the construction of an all paper pallet which is of low cost and completely recyclable. The supports 10 are utilized as the feet or stand-offs, in the manner of a conventional pallet construction, to either support an upper pallet skin above the floor surface or to separate the upper and lower skins of a double-skinned pallet.

The support 10 includes a generally cylindrical body 11 and a pair of opposite integral end flanges 12. The support may be constructed to any convenient size such as for example a height of 4 inches (10.2 cm), a maximum flange diameter of 5 inches to 6 inches (12.7 cm to 15.2 cm), and an inside cylindrical diameter of about 3 inches to 4 inches (7.6 cm to 10.2 cm).

Referring also to FIGS. 1–3, the pallet supports 10 of the present invention are formed from individual paper strips 13 which are wound on a rigid flanged spool 27. In the embodiment of the system shown in the drawings, the paper strips 13 are formed from a continuous paper web 15 supplied from a conventional roll 16 of paper.

An important aspect of the present invention maintains the fiber orientation in the paper web 15 so that the fibers in the cylindrical body 11 of the finished pallet support 10 are oriented generally parallel to the axis of the body and, in the finished pallet, are positioned vertically to impart the greatest compressive strength to the support 10.

The web 15 is fed from the roll 16 by any convenient means, such as a nip roll feeder 17 onto the bed of a die cutter 18. The die cutter 18 may be of either a rotary or flat bed type. The die cutter 18 functions to simultaneously cut from the end of the web 15 a rectangular sheet 20, cut the sheet generally longitudinally to form two substantially identical paper strips 13, and slit portions of the longitudinal edges of both strips in a generally transverse direction with respect to the strip lengths. The rectangular sheet 20 may have a length of 8 feet (2.44 m) and a width of about 10 inches (25.4 cm). The tapered cut line 21 along the length of the sheet results in identical strips 13 with opposite end dimensions of 4 inches (10.2 cm) and 6 inches (15.2 cm). To provide complete longitudinal symmetry in both strips 13, tapered trim portions 19 are preferably trimmed from both lateral edges of the sheet 20 in the die cutter. As indicated, the die cutter 18 also provides patterns 23 of slits 22 which slit patterns also preferably taper from a maximum length at the wider edge of the strip 13 to a minimum at or near the narrower end. As will be described hereinafter, the slit patterns 23 may terminate some distance from the narrower (4 inch) edge of the strip 13.

The opposite ends of the bed of the die cutter 18 are provided with pairs of driven nip rolls 24 to convey the paper strips 13 in opposite directions, each into an identical gluing and winding station 25. In the station 25, a coating of adhesive is applied to the upper surface of the paper strip 13 with a roll-type glue applicator 26. From the glue application 26, the web is transferred onto a rotating spool-shaped mandrel 27 where the strip is wound to form the laminated support 10. The glue applicator 26 is operated to allow an initial portion of the length of the strip which forms the first wrap on the mandrel 27 to pass without glue application in order to prevent the initially wrapped layer from sticking to the mandrel. The remainder of the strip is coated over its entire surface.

Referring again also to FIGS. 4–6, the maximum width of the wider end of the paper strip 13 is greater than the axial length of the winding mandrel 27, thereby allowing the initial wraps of the strip on the mandrel to conform to the mandrel flanges 28 and form the end flanges 12 of the laminated pallet support. As may best be seen in FIG. 3, the slit pattern 23 on the edges of the paper strip 13 allows the edges of the initial wraps to open or flare as they conform to the shape of the mandrel 27. To assure that the strip conforms to the shape of the mandrel as it is wound thereon, a contoured pressure roller 30 operates against the surface of the strip 13 as it is being wrapped. The spacing between the slits 22 in the edge pattern 23 is carefully controlled so that the slits in the second wrap of the strip on the mandrel are more or less centered on the tabs 31 defined by adjacent slits 22. This assures continuity and structural rigidity in the end flanges 12 of the finished support 10. Thus, the tapered slots 32, which are formed from the slits 22 as the tabs 31 flare during winding, are bridged by the tabs of subsequent layers which are secured to the preceding layer by the adhesive coating. Because of the tapered shape of the paper strip 13, each succeeding wrap recedes radially inwardly along the mandrel flange 28 until the width of the strip essentially equals the axial length of the cylindrical body 33 of the mandrel 27. At this point on the length of the strip, the slit pattern 23 may terminate and, indeed, the length of the strip may similarly terminate. However, it is also possible to continue winding a remaining length of strip to provide additional reinforcement for the cylindrical body 11 of the finished support. Referring to the cross sectional view of FIG. 6, the end faces 34 of each of the end flanges 12 of the finished pallet support are slightly tapered due to their conformance with the tapered flanges 28 of the spool-shaped mandrel. However, as will be described hereinafter, the end faces 34 become flattened when subjected to a vertical compressive loading for incorporation into the finished pallet structure.

Each of the spool-shaped mandrels 27 may be heated to enhance curing of the adhesive coating applied to the strip 13 and preferably includes a vacuum pickup device to facilitate attachment of the uncoated lead end of the strip to the mandrel until the initial wrap has been completed. One of the flanges 28 of the mandrel is removable so that the finished pallet support 10 may be removed axially from the mandrel.

With particular reference to FIG. 2, each winding station 25 includes a rotary carousel 35 carrying a plurality of mandrels 27 whereby a series of laminated pallet supports 10 may be successively wound and rotationally transported around the carousel 35 to a discharge station 36 positioned just behind the mandrel and pressure roller. In transit from the winding station to the discharge station on the carousel, the adhesive securing the laminated support is allowed to cure sufficiently to enable handling at the discharge station 36. At the discharge station, a picker arm 37 removes the cured pallet support 10 axially from the mandrel and preferably reorients the support to a vertical position for the subsequent incorporation of the support into a pallet structure. If desired, the picker arm mechanism could include robotic placement of the pallet supports to establish any desired array thereof for the pallet to be made.

Figure 8:
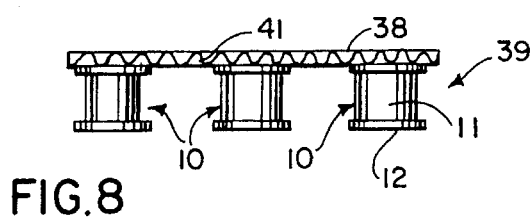
FIG. 8 is a side elevation of the pallet shown in FIG. 7.
Figure 7:
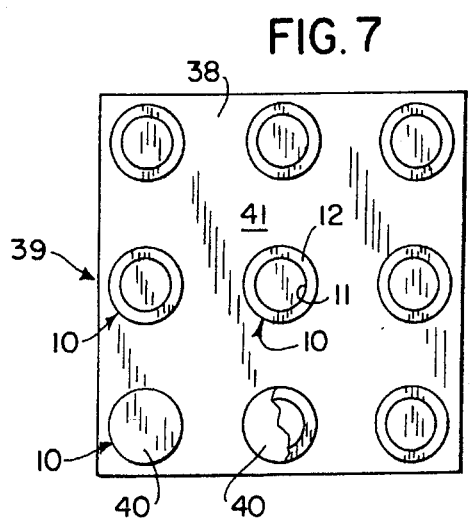
FIG. 7 is a bottom plan view of a paper pallet made in accordance with one embodiment of the present invention.

FIGS. 7 and 8 show the construction of one type of paper pallet utilizing the pallet supports 10 made in accordance with the foregoing process and apparatus. An array of pallet supports 10 is placed on an appropriate supporting surface, the end faces 34 of the support end flanges 12 are covered with a suitable adhesive and an upper skin sheet 38 is pressed onto the upper end faces of the supports. Referring briefly to the cross sectional view of the pallet support in FIG. 6, the end faces 34 may be formed with a slight taper or conical depression. However, when the upper skin sheet 38 is pressed onto the end faces of the support array, the end faces are flattened and held until the adhesive sets. This also assists in expanding somewhat the load bearing surface. In an alternate construction, one or both of the open ends of the pallet supports 10 could be closed by adhesively attaching a circular disk 40 to the end face 34 with a suitable adhesive. The upper skin sheet 38, in the embodiment shown, comprises a rigid corrugated paperboard sheet 41. If the lower end faces 34 of the pallet 39 shown in FIGS. 7 and 8 are closed with suitable circular paper disks 40, the ability to stack the pallets is enhanced, in addition to providing better load distribution. The pallet 39 of FIGS. 7 and 8 would be particularly useful for handling loads with a pallet jack where pallets having a lower skin layer cannot be utilized.

Figure 9:
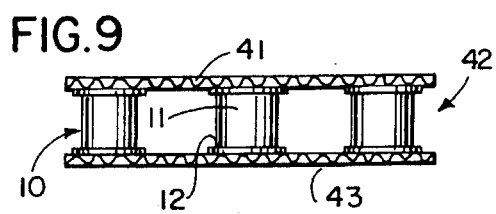
FIG. 9 is a side elevation of an alternate embodiment of the pallet shown in FIGS. 7 and 8.

In FIG. 9, there is shown an alternate embodiment of a pallet 42 which is similar to the embodiment of FIGS. 7 and 8, but includes the addition of a lower skin sheet 43 also constructed of corrugated paperboard. The paperboard sheet 41 for either the upper skin 38 or the lower skin 43 could also be made of multilayer double wall paperboard or any other suitable paperboard or fiberboard layer. The array of pallet supports utilized in the pallets 39 and 42 of FIGS. 7–9 is arranged to allow forklift entry from any direction. Many other arrays are, of course, also possible. For example, the pallet supports 10 could be arranged in rows in which the supports comprising each row are closely spaced.

In FIGS. 10a–10d, there is shown an alternate embodiment of the subject invention in which a pallet utilizing pallet supports 10 is formed integrally with the load supported thereon. In the example shown, the load comprises a stack of paperboard sheets 44, but could as well include virtually any type of load conventionally stored and transported on a pallet. This stack of paperboard sheets 44 is placed atop a slip sheet 45 which, in turn, would typically be supported on a conventional conveying system (not shown) for movement through the process to be described. The slip sheet preferably comprises a heavy but flexible paper sheet having a thickness, for example, of 0.020 inch (0.5 mm). This slip sheet has an area somewhat larger than the top plan area of the load 44, such that the edges 46 of the slip sheet extend outwardly slightly from the side faces 47 of the load of stacked sheets 44. The stack and underlying slip sheet 45 are conveyed into a conventional strapping station where load encircling straps 48 are placed around the stack, including the slip sheet. Thus, the slip sheet is strapped directly to the stack and the extended edges 46 are wrapped upwardly a short distance along the side faces 47. The strapped stack and slip sheet are then moved to an area in which a suitable array of pallet supports 10 (such as shown in FIGS. 7–9 but without the skins sheets 38 and 43) has been positioned on a supporting surface 50 and the strapped load is placed with the slip sheet 45 directly onto the end faces 34 of the supports (to which a suitable adhesive coating has previously been applied). The result is a pallet formed integrally with the load and, notwithstanding the flexibility of the slip sheet 45, the rigidity of the paperboard sheets comprising the load is sufficient to impart the necessary structural rigidity and strength which would be provided by a conventional pallet. The supporting surface 50 could, for example, comprise another conveyor system which would convey the palletized load to a convenient location for further processing.

Figure 10A:
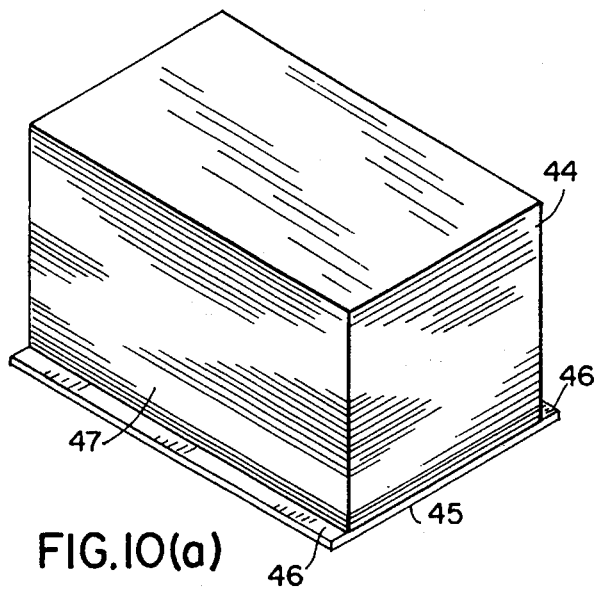
FIG. 10a is a perspective view of a load of sheet material to which a pallet made in accordance with an aspect of the present invention is to be applied.
Figure 10B:
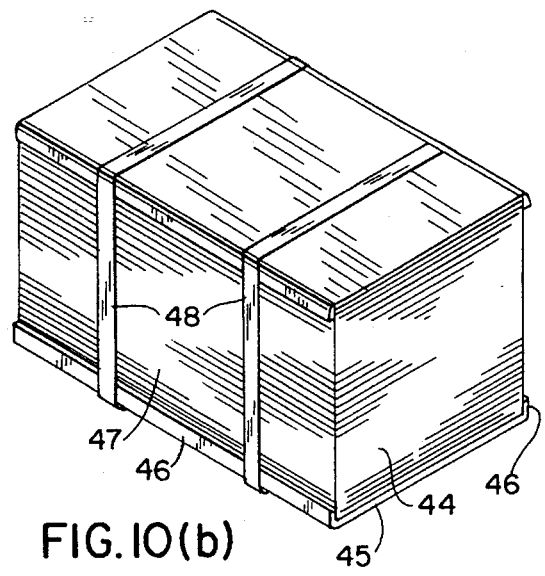
FIG. 10b is a perspective view of the load of sheet material shown in FIG. 10a after an intermediate banding step.
Figure 10C:
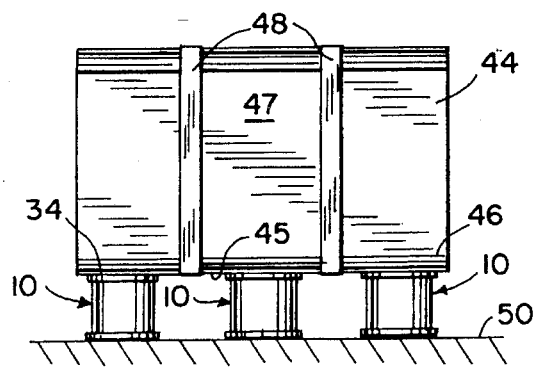
FIG. 10c is a side elevation view of the banded load of FIG. 10b after the pallet supports of the present invention have been applied thereto.
Figure 10D:
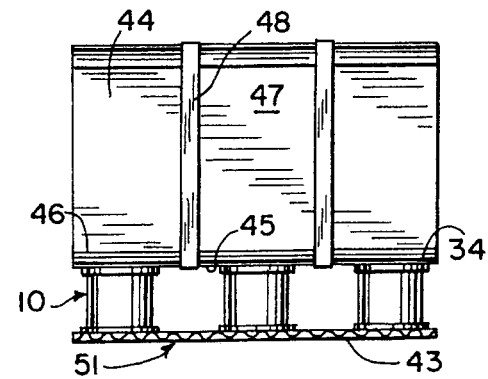
FIG. 10d is a side elevation view similar to FIG. 10c showing a modified pallet construction.

Referring to FIG. 10d, if the load to be strapped to the slip sheet and glued to an array of pallet supports does not have the requisite structural rigidity (e.g. because it comprises small individual boxes or the like), a modified supporting pallet structure 51 could be used. In that structure, the array of pallet supports 10 is placed upon and glued to a lower skin sheet 43 which may be identical to that shown in FIG. 9. The corrugated lower sheet 43 is, in turn, supported on a surface 50 which could comprise a conveyor. The strapped load 44 including the slip sheet 45 is similarly placed on and glued to the upper end faces 34 of the pallet support array, as previously described. The lower corrugated skin sheet 43 provides the necessary compressive strength to resist bending when the non-rigid load is lifted, as by inserting the fork of a lift truck between the pallet supports 10 and under the slip sheet 45.

The pallet system described herein provides a wide flexibility, enabling it to be operated to manufacture load supporting pallets of varying sizes and capacities, completely of paper materials, and utilizing a minimum fiber content for the load to be handled. The pallet support winding system could easily be operated right at the manufacturing or processing facility where the loads of materials are being assembled or processed. Certain suitable adhesives which are recognized as recyclable with the paper could be used, such as PVA adhesive. Depending on the load to be handled, either of the pallet systems of FIG. 10c or FIG. 10d can be designed to use a minimum of material for disposal or recycling. When the load 44 is ready to be removed from the pallet, the straps 48 are cut and removed, and the adhesively attached assembly of the slip sheet 45, pallet supports 10, and lower skin sheet 43 (if used) are disposed of or recycled as a unit.

FIGS. 11 and 12 show schematically an alternate apparatus for forming a variant pallet support 52 which is shown in an enlarged sectional view in FIG. 13. The winding method for forming the support 52 is essentially the same as that previously described with respect to the apparatus of FIGS. 1 and 2. In this embodiment, the paper strip 53 comprises a single face paperboard web 56 made from a composite of a liner web 54 and a corrugated medium web 55. The single face web 56 is formed in a conventional single facer 57 where the medium web 55 is formed and joined to the liner web 54.

The liner web 54 is supplied from a source, such as a roll stand and splicer (not shown), from which it is directed over a portion of the cylindrical drum of a liner preheater from which it passes between a pressure roller 62 and a corrugating roll 60 where it is joined to the medium web 55. The medium web 55, from a separate supply (not shown), also passes through a medium preheater 63 from which it is directed between the pair of corrugating rolls 58 and 60 which provide the web 55 with the well known fluted or corrugated configuration. The corrugated medium then passes over a glue applicator 64 where an adhesive is applied to the tips of the corrugations or flutes on one side of the corrugated web as it passes around the corrugating roll 60. The corrugated medium web 55 then passes between the nip formed by the pressure roll 62 and the corrugating roll 60 where it is pressed against the face of the liner web 54 to form the two layer single face web 56.

The single face web is directed from the single facer 57 into a web accumulator 65 from which it is fed as needed into a die cutter 66 similar to the die cutter 18 previously described. However, the single face web 56 passes linearly through the die cutter 66 without change of direction into the glue applicator 26 at the opposite end prior to winding on the mandrel 27.

As may best be seen in FIG. 11, the liner web 54 is substantially wider than the medium web 55 such that the completed single face web 56 is characterized by a corrugated central portion 67 and a pair of opposite laterally extended liner edge portions 68. The single face web 56 is fed with the corrugated medium 55 facing upwardly into the die cutter 66 where it is cut to a length for wrapping, trimmed and slit all in a generally similar manner previously described with respect to the embodiment of FIGS. 1 and 2. However, because this embodiment utilizes linear in-line processing, the web 54 is not divided in two, but rather trimmed and slit to form the unitary paper strip 53. In the die cutter 66, the liner edge portions 68 are trimmed on tapered cut lines 70 and the tail end 71 of the strip 53 is severed from the web 56. Simultaneously, lateral slits 72 are cut into the tapered edge portions which remain on the strip 53.

The trimmed and slit single face paper strip 53 is conveyed into the gluing and winding station 25, as previously described, where the initial length of the strip which forms the first wrap on the mandrel 27 passes without any glue application. This prevents the initially wrapped layer and the eventually formed pallet support from sticking to the mandrel. Thereafter, glue is applied to the upwardly facing tips of the exposed flutes and to the tapered slit edge portions and transferred onto the rotating mandrel 27 where the strip is wound to form the laminated support 52 in a manner virtually identical to the winding process previously described. The width of the corrugated medium 55 is approximately equal to the axial length of the cylindrical body 33 of the spool-shaped mandrel 27. In this manner and referring also to FIG. 13, the corrugated medium forms only the cylindrical body 73 of the support 52 and, correspondingly, the end flanges 74 of the support are formed only from the slit edge portions of the liner 54. As with the previously described embodiment, the maximum width lead end portion of the strip 53 permits the initial wraps of the strip on the mandrel 27 to conform to the flanges 28 with the slits 72 allowing the edges of the strip to flare and spread open as they conform to the shape of the mandrel. A pressure roller 30 is utilized in the same manner previously described. The resultant pallet support, assuming a length of strip 53 the same as the unitary paper strip 13 used in the initially described embodiment, will have similar end flanges 74, but a cylindrical body 73 of substantially greater radial thickness and resultant strength because of the inclusion of the corrugated medium. In certain applications, the length of paper strip 53 and the total number of wraps on the mandrel may be reduced.

In FIG. 14, there is shown a modified pallet support 75 which may be made utilizing either a plain paper strip 13 or a single face paper strip 53 of the previously described embodiments. However, the strip which is utilized is substantially wider and wound onto a mandrel (not shown) of extended axial length, for example, twice the length of the mandrel 27 previously described. After the modified support 75 is completed, it is cut in half on a slit line 76 in a plane normal to the pallet support axis to form a pair of single-flanged supports 77. Single flanged supports may be utilized in the manufacture of pallets for use in applications where the load does not need to be distributed over the surface on which the pallet is supported. The flanged end of the support 77 may be attached to any suitable pallet sheet, such as a corrugated skin sheet 38 (FIG. 8) or a unitary paper slip sheet 45 (FIG. 10c). The modified pallet support 75 may be cut on the slit line 76 right on the mandrel on which it is wound and, in this respect, the mandrel may be made to separate at the slit line for removal of the two single-flanged supports 77.

With respect to any of the previously described pallet supports 10, 52, or 77, the strips from which they are formed, whether unitary paper strips 13 or single face corrugated strips 53, may be provided with interrupted, non-continuous glue patterns. This is true particularly with respect to the surface of the paper strip 13 and the tapered edge portions 68 of the strip 53, since the fluted medium portion of the strip 53 inherently receives an interrupted glue pattern by virtue of the adhesive being applied only to the tips of flutes. An interrupted glue pattern on the flat paper portions of either of the strips, however, will provide adequate strength and, at the same time, provide more ready access to water in the repulping process used to recycle the pallets. For example, it is believed that a printed glue pattern covering approximately only 25% of the total surface area of the flat sheet portions of the strips may be necessary. However, it may be important to carefully orient any printed glue pattern so that adequate surface adhesion is attained in the slit edge portions forming the flanges of the supports. The glue pattern may, of course, be varied so that more adhesive is applied to the edge portions than to the center portion of the strip forming the cylindrical body of the support.

Various modes of carrying out the present invention are contemplated as being within the scope of the following claims particularly pointing out and distinctly claiming the subject matter which is regarded as the invention.

We claim:

1. A method for manufacturing a pallet support comprising the steps of:
   (1) forming a narrow strip of paper tapered along its length;
   (2) slitting portions of both longitudinal edges of the paper strip in a generally transverse direction;
   (3) applying a coating of adhesive to one side of the paper strip;
   (4) attaching the wider end of the paper strip to a flanged spool;
   (5) winding the coated paper strip on the flanged spool to form a hollow laminated flanged support and, allowing the edges of the strip forming the flanges of the support to flare during winding; and
   (6) removing the support from the spool.

2. The method as set forth in claim 1 wherein the adhesive coating in the applying step is applied to the portion of length of the strip which in the subsequent winding step, overlies a length of strip previously wound.

3. The method as set forth in claim 1 including the preliminary steps of:
   (1) cutting from a web of paper a rectangular paper sheet having a length equal to the length of said strip and an area two times the area of said strip;
   (2) cutting the paper sheet generally longitudinally to form two substantially identical paper strips; and,
   (3) performing the steps of applying, winding, and removing separately on each of said strips.

4. The method as set forth in claim 1 wherein the completed flanged support includes a generally cylindrical body and integral end flanges and including the step of positioning the paper from which the strip is prepared to orient the major proportion of the paper fibers in the transverse direction across the strip, whereby said fibers in the cylindrical body of the completed support extend primarily parallel to the axis thereof.

5. A method for manufacturing a pallet comprising the steps of:
   (1) forming narrow tapered strips of paper;
   (2) slitting portions of the longitudinal edges of the strips in a generally transverse direction;
   (3) applying a coating of adhesive to one side of each paper strip;
   (4) winding each of the coated paper strips on a flanged spool to form hollow laminated flanged supports each including a generally cylindrical body and integral flared end flanges;
   (5) removing the supports from the spools; and,
   (6) bonding a plurality of said flanged supports to a first planar pallet skin by providing an adhesive layer between the flange end faces and the surface of said first pallet skin.

6. The method as set forth in claim 5 including the step of bonding said flanged supports to a second planar pallet skin by providing an adhesive layer between the opposite flange end faces and the surface of said second pallet skin.

7. The method as set forth in claim 5 wherein said first pallet skin comprises a paper sheet strapped to the lower surface of a load to be supported on the pallet.

8. The method as set forth in claim 6 wherein said first pallet skin comprises a flexible paper sheet and said second pallet skin comprises a rigid paperboard sheet.

9. An apparatus for manufacturing a pallet support comprising:
   (1) means for forming a narrow tapered strip of paper;
   (2) means for slitting portions of the longitudinal edges of the strip in a generally transverse direction;
   (3) means for applying a coating of adhesive to one side of the paper strip;
   (4) means for winding the coated paper strip on a flanged spool to form a hollow laminated flanged support including a generally cylindrical body and integral flared end flanges; and,
   (5) means for removing the support from the spool.

10. The apparatus as set forth in claim 9 wherein the winding means is operative to initially attach the wider end of the paper strip to the spool.

11. The apparatus as set forth in claim 9 wherein the completed flanged support includes a generally cylindrical body and integral end flanges and further comprising means for positioning the paper from which the strip is prepared to orient the major proportion of the paper fibers in the transverse direction across the strip, whereby said fibers in the cylindrical body of the completed support extend primarily parallel to the axis thereof.

12. A method for securing a load of material on a pallet, said method comprising the steps of:
   (1) placing the load of material atop a paper sheet;
   (2) strapping the sheet to the load with a load-encircling strap disposed in a generally vertical plane;
   (3) preparing a plurality of laminated pallet supports, each made from a wound adhesive-coated tapered paper strip the edge portions of which are slit transversely before winding and each of said supports comprising a generally cylindrical hollow body and opposite integral flared end flanges defining end faces; and,
   (4) bonding the underside of the sheet strapped to the load onto the upwardly facing end faces of the upper flanges of an array of said pallet supports by providing an adhesive layer between said end faces and said paper sheet.

13. The method as set forth in claim 12 including the step of bonding the top surface of a rigid paperboard sheet to the downwardly facing end faces of the lower flanges of said array by providing an adhesive layer between said downwardly facing end faces and said paperboard sheet.

14. The method as set forth in claim 12 including the step of adhesively attaching circular paper closure disks to the downwardly facing end faces of the lower flanges of said array.

15. The method as set forth in claim 1 wherein the paper strip comprises a web of single face corrugated paperboard and including the modified step of winding the corrugated strip with the corrugated medium on the inside.

16. The method as set forth in claim 15 including the modified step of forming the paper strip with a narrow corrugated medium and a laterally wider liner.

17. The method as set forth in claim 1 including the step of slitting the laminated flanged support in a plane perpendicular to its axis to form two single-flanged supports.

* * * * *